Aug. 17, 1948.  V. E. MATULAITIS ET AL  2,447,130
ACCESSORY DRIVE
Filed Sept. 23, 1944
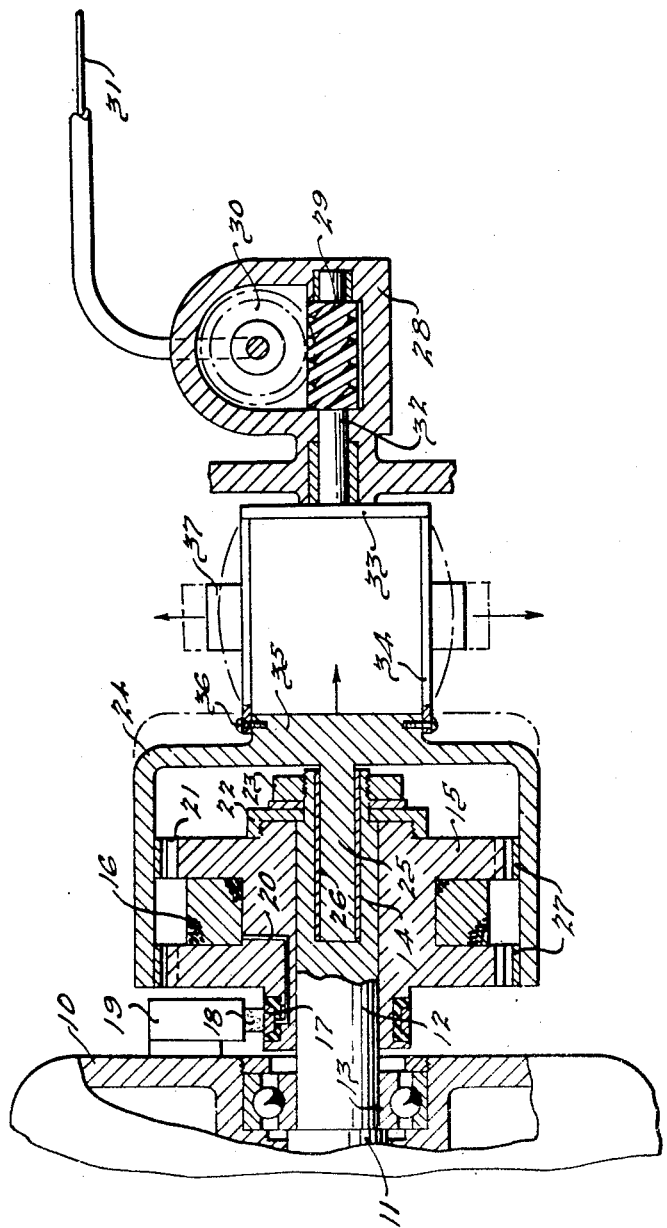
INVENTORS.
Victor E. Matulaitis,
Franklin W. Edwards,
BY Henry R. Voorhees.
Harness & Harris
ATTORNEYS.

Patented Aug. 17, 1948

2,447,130

UNITED STATES PATENT OFFICE 2,447,130

ACCESSORY DRIVE

Victor E. Matulaitis, Rochester, N. Y., and Franklin W. Edwards, Detroit, and Henry R. Voorhees, Grosse Pointe Farms, Mich., assignors to Chrysler Corporation, Highland Park, Mich., a corporation of Delaware Application September 23, 1944, Serial No. 555,480

4 Claims. (Cl. 172—284)

1

This invention relates to means for driving motor vehicle accessories from the engine of the vehicle. More particularly it relates to an improved means and apparatus for driving a windshield wiper, but almost any other type of accessory may be driven by similar means, either alone or in combination with the wiper drive.

Our improved driving means makes it possible to drive the windshield wiper mechanism directly from the vehicle engine at a constant speed regardless of engine speed.

It is the prime object of the invention to provide an improved means for driving the vehicle windshield wipers.

Another object is to provide means for coupling the wiper mechanism to the vehicle engine such that the wipers are driven mechanically from the engine.

A further object is to provide a constant speed drive for a wiper mechanism driven from the engine.

A still further object is to provide a simple, cheap and rugged drive means for accomplishing the foregoing and one which has inherent shock absorbing characteristics.

Other objects and advantages will be apparent from the following specification which describes a preferred embodiment of the invention.

The accompanying drawing illustrates the device in section.

Referring to the drawing, it may be seen that we have shown in partial section a generator 10. This generator is the regular engine mounted generator conventionally found on motor vehicles. For the sake of brevity we have omitted the engine, windshield and wiper blades, it being deemed sufficient to state that our invention is applicable to practically any standard motor vehicle as will be readily understood by those skilled in the art.

The generator 10 has the conventional armature (not shown) mounted on a shaft 11 having a reduced portion 12 supported in the end bearing 13. The shaft 11 differs from a standard generator shaft in that it is longer and the elongated portion has an internal bore 14.

Mounted on the reduced portion 12 of the shaft is a driving member 15 of a magnetic clutch or coupling of the eddy-current type. This driving member 15 is of magnetic material and of U-shape in section. A field coil 16 is carried by member 15 and is adapted to be energized by means of a slip ring 17 and brush 18, the latter being carried by a brush holder 19 preferably mounted on the generator housing as shown.

2

The slip ring 17 is connected to one end of the coil, the other end being grounded to the frame.

The member 15 is provided with peripheral teeth 21, the purpose of which will be explained. A flange 22 and a nut 23 retain the member 15 on the shaft 11 for rotation therewith at generator speed which is some multiple of engine speed as determined by the driving pulley diameters.

The eddy-current coupling driven member 24 is mounted on shaft 11 for rotation relatively thereto by means of a stub shaft extension 25 formed integrally therewith. An anti-friction bushing 26 separates the shaft 25 and bore 14, the shaft and bushing being of sufficient length to insure a rigid support for the member 24.

The member 24 is of dished annular form and has a pair of copper rings 27 disposed within the dished portion in radial alignment with the teeth 21 of the driving member.

When the coil 16 is energized a magnetic field is set up around the coil, the flux path of which includes both the members 15 and 24. Regions of alternate high and low flux density are set up in member 24 because of the teeth 21 which of course decrease the air gap where they are located. When member 15 is rotated, the member 24 tends to rotate with it. This is due to the fact that eddy currents are induced to flow in members 15 and 24 because of the variation in flux density caused by the teeth 21 passing by points of member 24. These eddy currents produce a flux which opposes the main flux and this counter-flux in accordance with Lenz's law, tends to oppose relative rotation of the coupling members.

The member 24 will, therefore, tend to approach the member 15 in speed and rotate synchronously therewith. Synchronous rotation is of course impossible because of inherent losses and the device operates with a slip between the driving and driven members which varies in accordance with the designed characteristics of the coupling and with the load.

Fixed to the frame or body of the vehicle is a support and gear housing 28. This housing contains a worm 29 disposed in mesh with a worm wheel 30. The latter is connected by means of a flexible drive cable 31 with the wiper mechanism or other accessory to be driven.

The worm shaft 32 mounts a plate 33 to which are attached by welding, brazing or the like, a number of flexible connectors 34. These connectors may be of Phosphor bronze, spring steel or other material that will withstand continuous flexing. Each of the connectors is fastened to a hub 35 formed integrally on member 24 by means of set screws 36. At least two of the connectors disposed opposite each other carrying weights 37.

The weights 37 are of such size that centrifugal force will act to move them radially outwardly and thus shift the member 24 bodily toward the right a predetermined distance at predetermined speeds of rotation.

Shifting of the coupling driven member 24 axially of the assembly will lengthen the air gap and lower the efficiency of the coupling with consequent drop in speed of the driven member. The slip under normal conditions with the parts positioned as shown in full lines is in the order of 3%. As the speed of the driven member tends to increase above a desired maximum the weights 37 will move outwardly and shift the member 24 axially toward the right whereupon the slip will increase.

It will thus be seen that regardless of the variation in speed of the generator shaft 11 caused by variation in the speed of the engine, the speed of the coupling driven member 24, and of the wiper blades or other accessory, will remain substantially constant, the weights 37 "hunting" to provide speed regulation.

The present arrangement provides an exceptionally convenient and satisfactory drive for a vehicle windshield wiper. By mounting the eddy-current coupling on the generator wiring is simplified and accessibility is good. Our improved drive provides a mechanical driving connection between the wiper mechanism and the engine crankshaft which provides constant speed for the wipers and excellent shock absorption, the eddy-current coupling slipping readily in response to momentary stoppage of the wiper blades due to ice, etc. The latter feature is important and eliminates breakage of the cable 31 which has been a source of trouble in existing designs.

It will be understood that we have illustrated but one of the many forms of our invention and we do not intend to limit the same in its broader aspects except as set forth in the appended claims.

Where our invention is employed to drive windshield wiper blades, reference is made to the copending application of Franklin W. Edwards Serial No. 546,405 filed July 24, 1944, which illustrates a suitable typical arrangement of blades which may be driven from our cable 31 as will be readily understood.

We claim:

1. An electromagnetic coupling comprising, an input member; a shaft mounting said input member and having a hollow bore; a dished output member surrounding said input member and having a stub shaft adapted to be received in said bore; an axially rigid driven shaft; radially flexible members connecting said output member and said driven shaft.

2. An electromagnetic coupling comprising, an input member; a shaft mounting said input member and having a hollow bore; a dished output member surrounding said input member and having a stub shaft adapted to be received in said bore; an axially rigid driven shaft; radially flexible members connecting said output member and said driven shaft, and weights carried on said members whereby said output member is shiftable by centrifugal force.

3. A coupling between a driving shaft and a driven shaft comprising an input member secured to said driving shaft, means associated with said input member and adapted to create a magnetic field, an output member adapted to be positioned directly in said magnetic field and axially withdrawn from the immediate field, a second means providing the only operative connection between said output member and said driven shaft and adapted to transmit rotation from said output member to said driven shaft, said second means being speed responsive and adapted to withdraw said output member from said immediate field in response to increases in its speed of rotation whereby the speed of rotation of said output member is governed by said second means.

4. A coupling between a driving shaft and a driven shaft comprising an input member secured to said driving shaft, means associated with said input member and adapted to create a magnetic field, an output member adapted to be positioned directly in said magnetic field and axially withdrawn from the immediate field, a plurality of weighted flexible elements providing the only operative connections between said output member and said driven shaft, said elements being adapted to transmit rotation from said output member to said driven shaft and being adapted to flex and withdraw said output member from said immediate magnetic field in response to centrifugal force.

VICTOR E. MATULAITIS.
FRANKLIN W. EDWARDS.
HENRY R. VOORHEES.

REFERENCES CITED

The following references are of record in the file of this patent:

UNITED STATES PATENTS

| Number | Name | Date |
|---|---|---|
| 1,553,621 | Locklin | Sept. 15, 1925 |
| 1,787,648 | Waters | Jan. 6, 1931 |
| 1,887,284 | Brady | Nov. 8, 1932 |
| 2,025,487 | Winther | Dec. 24, 1935 |
| 2,193,214 | Winther | Mar. 12, 1940 |
| 2,243,016 | Pritchard | May 20, 1941 |
| 2,271,087 | Maier | Jan. 27, 1942 |
| 2,280,736 | Winther | Apr. 21, 1942 |